April 5, 1938.  A. EDMONSTON ET AL  2,113,474
TIRE PRESSURE INDICATOR
Filed Oct. 17, 1936  4 Sheets-Sheet 1

Inventor
Allie Edmonston
Arthur C. Duclos
By Clarence A. O'Brien
Hyman Berman
Attorneys

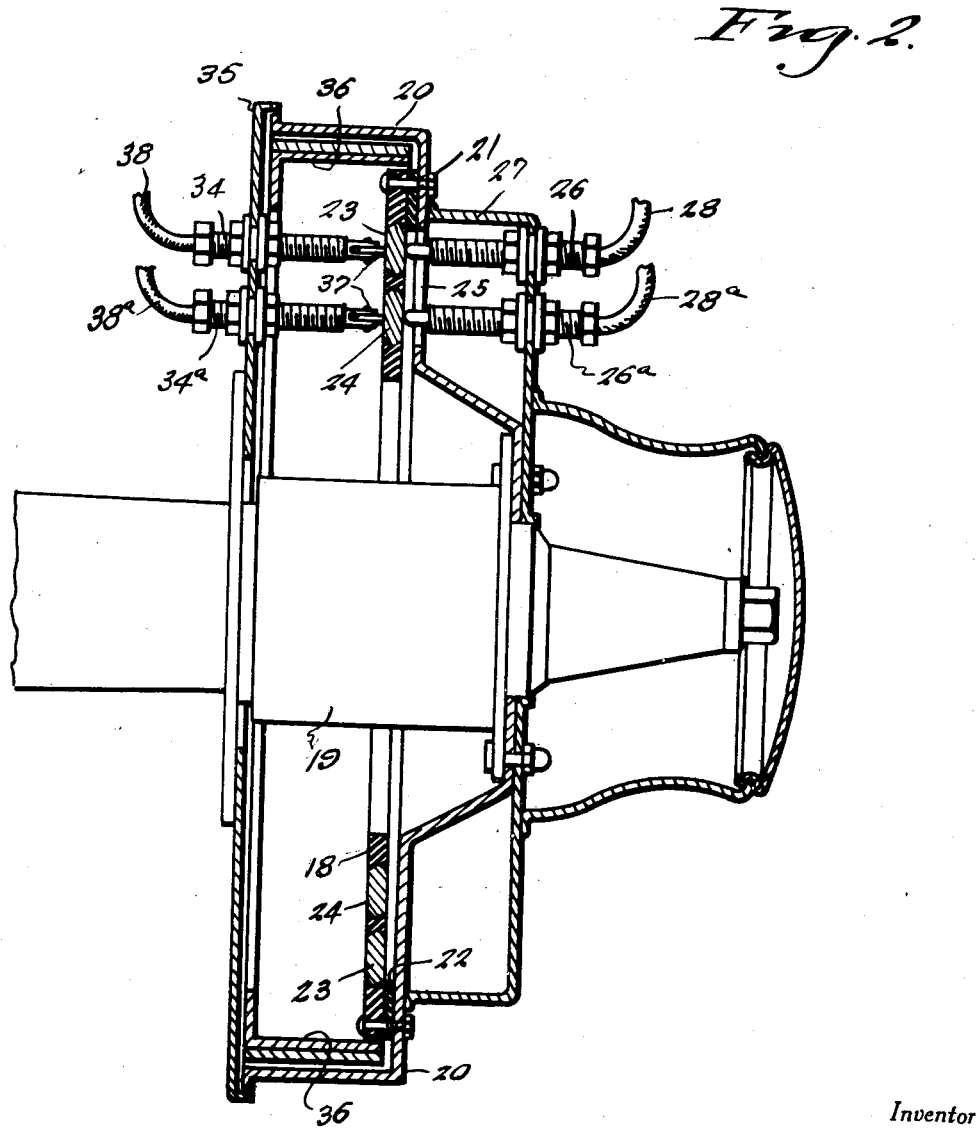

April 5, 1938.  A. EDMONSTON ET AL  2,113,474
TIRE PRESSURE INDICATOR
Filed Oct. 17, 1936   4 Sheets-Sheet 3

Inventor
Allie Edmonston
Arthur C. Duclos
By
Clarence A. O'Brien
Hyman Berman
Attorneys April 5, 1938.   A. EDMONSTON ET AL   2,113,474
TIRE PRESSURE INDICATOR
Filed Oct. 17, 1936   4 Sheets-Sheet 4
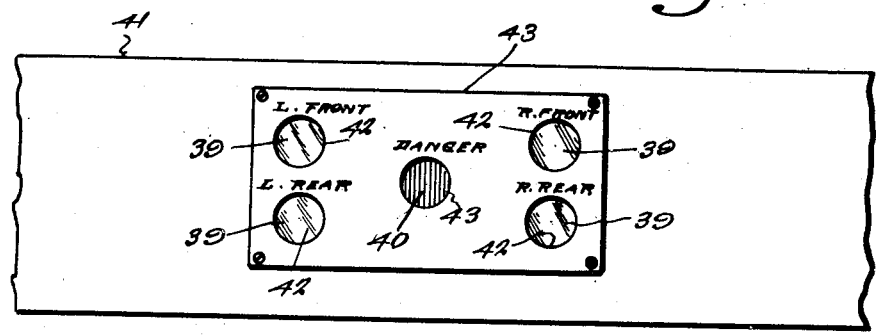
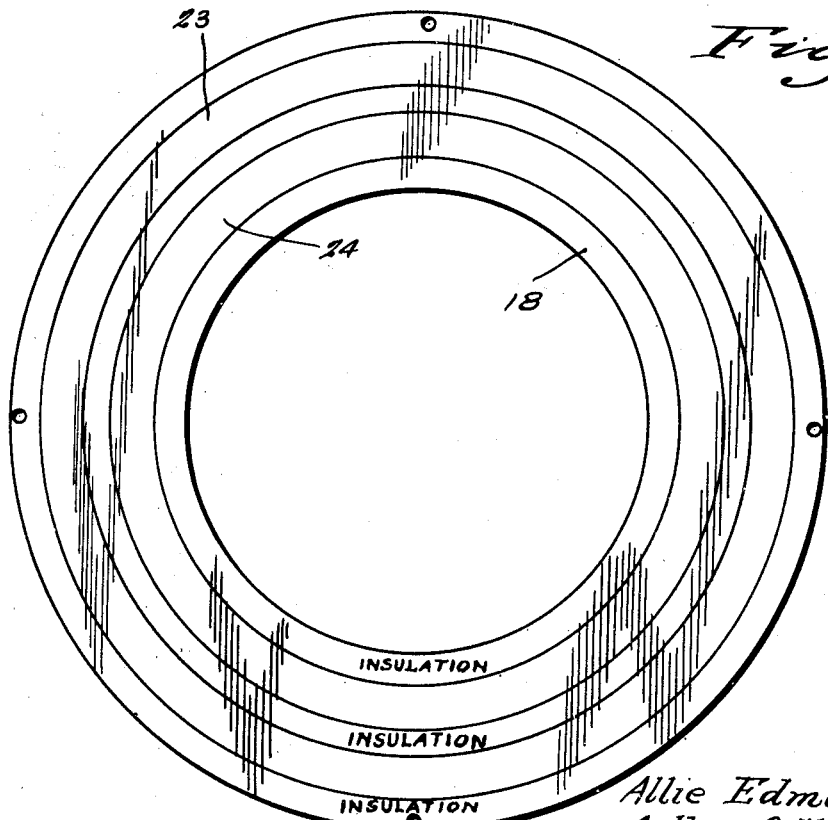

Patented Apr. 5, 1938

2,113,474

UNITED STATES PATENT OFFICE 2,113,474

TIRE PRESSURE INDICATOR

Allie Edmonston and Arthur C. Duclos, Manila, Ark.

Application October 17, 1936, Serial No. 106,250

1 Claim. (Cl. 200—58)

This invention relates to a device for use with motor vehicles for automatically indicating the air pressure within the pneumatic tires of the wheels.

The object of the invention is to provide means whereby the operator of a motor vehicle is kept fully informed at all times of the tire pressure so that proper steps may be taken in time to correct unsafe pressure conditions constituting a hazard to safe driving and efficient operation or control of the vehicle.

A further object of the invention is to provide an automatic tire pressure indicating device for motor vehicles whereby loss of tire pressure is indicated over a range from small leaks to an unsafe low pressure condition.

In addition, the invention provides a tire pressure indicator of simple and economic construction whereby it is adapted to be applied to any and all makes of motor vehicles, and which requires a minimum expenditure of time and labor in its installation.

With the above in view, the invention consists in the novel arrangement, construction and combination of parts hereinafter more fully described and pointed out in connection with the accompanying drawings, wherein:

Figure 2 is a transverse section on the line 2—2 of Figure 1.

Figure 4 is a side view of the current collecting ring.

Figure 9 is a fragmentary view in elevation of the instrument panel of a motor vehicle equipped with the signal and indicator unit of the invention.

Figure 3:
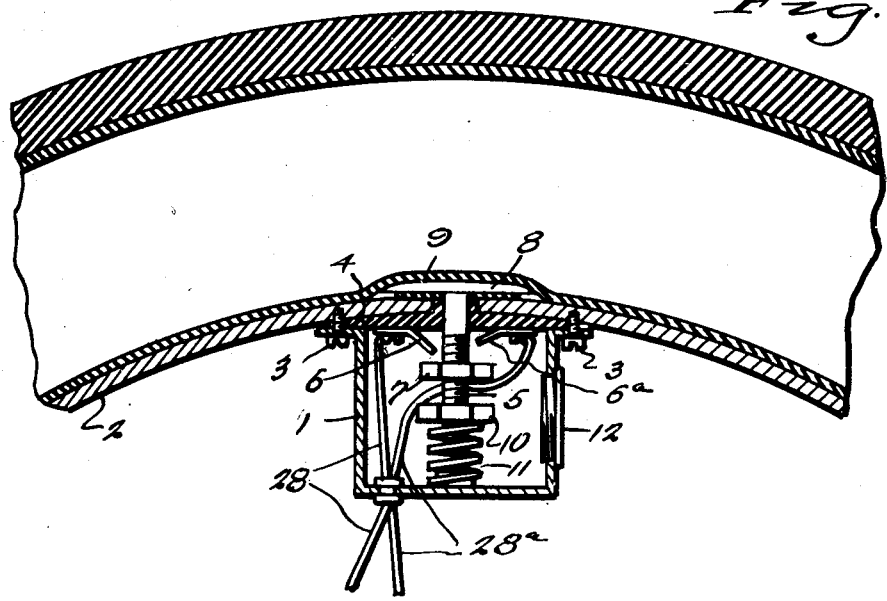
Figure 3 is a vertical longitudinal section of a segment of a wheel showing the signal circuit maker and breaker.

In applying the invention to a motor vehicle, each wheel of the vehicle is provided with a circuit maker and breaker responsive to decreases of pressure in the tire to close the signal circuit. Each circuit closer is preferably of the construction shown either in Figure 3 or in Figure 8.

In the first showing, the circuit closer consists of a switch casing 1 fastened to and electrically grounded through the underside of the wheel rim 2 by screws or similar fasteners 3 with insulating material 4 between the tire and the switch casing. Fastened to the insulation material 4 adjacent opposite sides of a movable pressure pin 5, electrically grounded with the casing 1, are spring contacts 6 and 6a arranged one slightly in advance of the other so as to be successively contacted by contact nut 7 screwed on pressure pin 5 to give a first and second indication or signal. The pressure pin extends through an opening in the wheel rim with a head or cushion 8 fixed on its inner end to lie between the inner surface of the wheel rim 2 and the inner tube 9 and with a nut 10 screwed on its inner end for adjusting the tension of coil spring 11; the latter being seated at one end against the casing and pressing at its other end against the adjusting nut 10 to thrust the pressure pin head 8 against the inner tube.

In the fully inflated position of the tire, the pressure within the inner tube and acting against the head of the pin, overcomes the resistance of the spring and positions the pin with its head pressed up against the inner face of the wheel rim and the contact nut spaced outwardly from the spring contact. In this condition of the switch, the electrical circuits controlled thereby are open and will remain open until such time as the pressure within the inner tube has decreased to an extent that the pin 5 will be moved by force of the spring 11 to initially engage contact nut 7 with the spring contact 6 to thereby close the first indicating circuit. In the event of a greater decrease in pressure beyond safe limits, the pin will be moved further to cause nut 7 to contact the spring contact 6a of the second indicating circuit. The switch may be inspected and the nut thereof adjusted through an orifice in the side of the casing closed by a screw plug 12.

Figure 1:
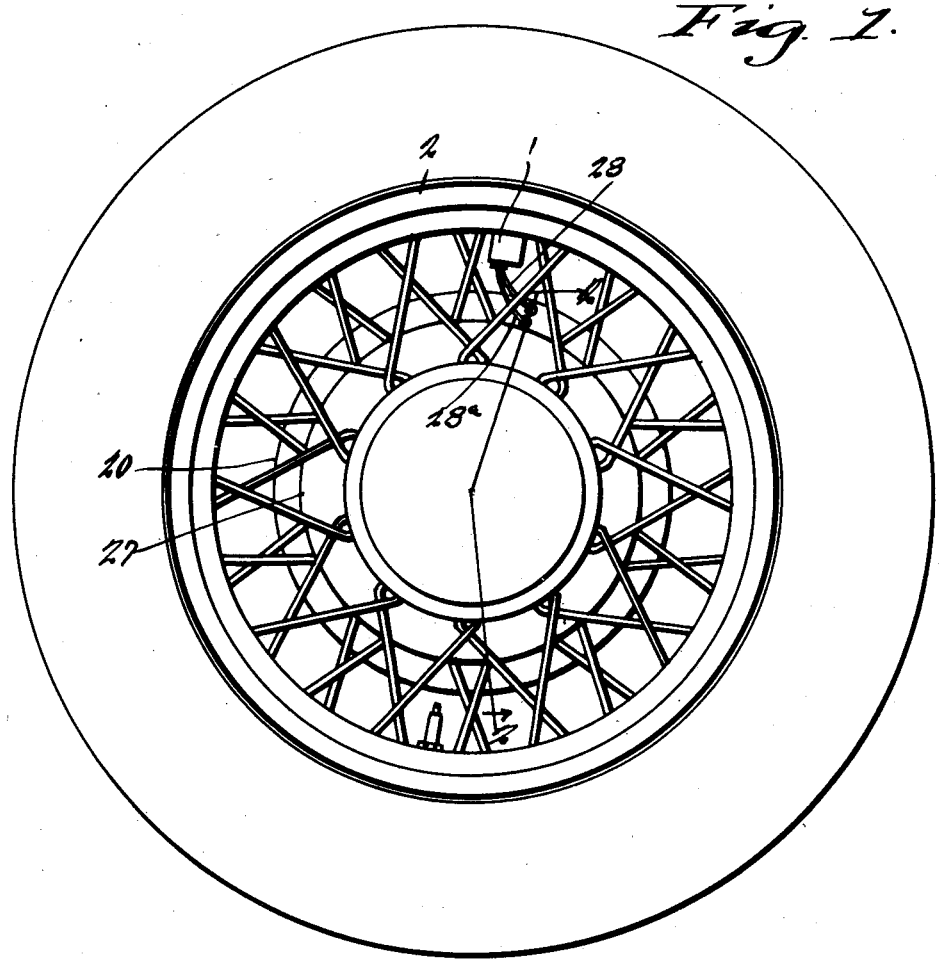
Figure 1 is a side elevation of an automobile wheel with the invention applied thereto.
Figure 8:
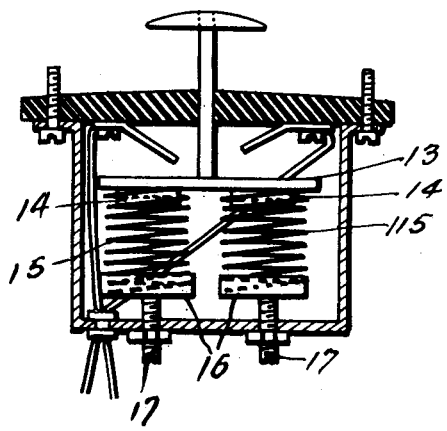
Figure 8 is a sectional view of an alternative form of signal circuit maker and breaker.

In the modified type of switch disclosed in Figure 8, the pressure pin is provided at its outer or encased end with a cross bar 13 provided on its underside with a pair of spaced spring seating lugs 14 encircled by the upper end of dual springs 15; the lower ends of the springs being seated in cups 16 at the inner ends of adjusting screws 17 located at the bottom of the casing.

Figure 6:
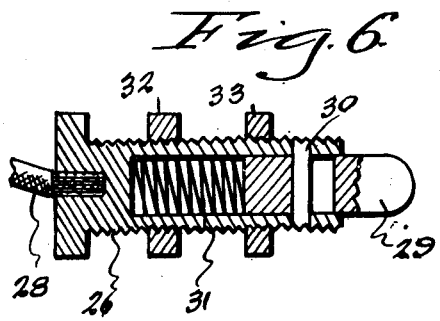
Figure 6 is a longitudinal sectional view of another type of brush also forming part of the collector unit.
Figure 7:
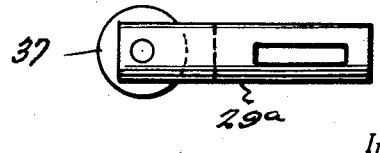
Figure 7 is a detail view of a contact roller forming a unit of the brush shown in Figure 5.

The present invention utilizes the conventional hub structure of the automobile wheel as a housing for the current collector unit of the indicator, as is apparent from the showing in Figure 2. The collector unit comprises a substantially flat annular disc 18 encircling the wheel axle or spindle 19 on the inside of the brake drum 20 to the inner side of which it is fastened by suitable means 21 and from which it spaced by insulating material 22. The collector disc is composed of concentric rings alternately of insulating material and conductive material; there being two conductor rings as indicated at 23 and 24. The collector ring revolves with the brake drum which is apertured at 25 to expose the conductor ring for contact with brushes 26 and 26a carried by the brake drum housing 27. Brushes 26 and 26a are electrically connected with the contacts 6 and 6a respectively of the pressure actuated circuit closer by the conductors 28 and 28a. These brushes are similarly constructed and as shown in Figure 6 respectively consist of an externally threaded bolt having a bore or socket housing a plunger 29 limited in its movement inwardly and outwardly of the socket by a cross pin 30 fixed to the bolt and extending through a slot in the plunger; the latter being elastically maintained at the limit of its outward movement by the force of a spring 31 tending to expand between the inner end of the plunger and the base of the socket. Each brush is clamped in an opening provided therefor in the brake drum housing by two clamping nuts 32 and 33 which are screwed up tight against the inner and outer faces of the housing to clamp the latter therebetween. An additional pair of brushes 34 and 34a are provided for contacting the conductor rings of the collector disc from the side of the stationary member or plate 35 of the brake assembly which carries the brake shoes 36.

Figure 5:
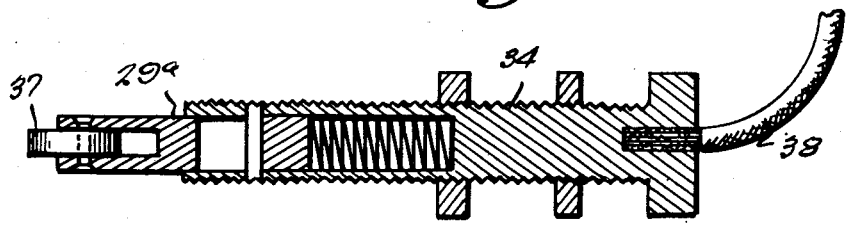
Figure 5 is a longitudinal sectional view of one type of brush forming part of the collector unit.

Brushes 34 and 34a are of the construction illustrated in Figure 5 and from a comparison with Figures 5 and 6, it will be observed that all the brushes of the collector unit are substantially identical in construction, and in the means of attachment to the hub structure of an automobile wheel. However, in view of the fact that the collector disc revolves with the wheel while the brushes 34 and 34a remain stationary with the brake shoes supporting plate to which they are attached, an anti-friction roller 37 is mounted at the end of the spring tensioned plunger 29a for rolling contact with the revolving collector disc. Brush 34 contacts with collector ring 23 of the first warning circuit and is connected by a conductor 38 through a source of potential (not shown) with an identifying unit 39 of the signal or indicator assembly shown in Figure 9. Brush 34a contacts with collector ring 24 of the second or emergency indicating circuit and is connected by the conductor 38a through a source of potential to a distinctive unit 40 of the signal and indicator assembly.

The signal and indicator assembly preferably consists of a plurality of small electric light bulbs, preferably five in number, suitably encased and mounted back of the instrument board 41 of the motor vehicle. Four of these bulbs constitute the individual wheel-identifying units 39 of the signal and indicator assembly and are designed to display white lights through the colorless glass of sight opening 42 provided in the color panel 43; each sight opening having suitable indicia adjacent thereto identifying the vehicle wheel with which the particular signal 35 is associated. The remaining bulb is located behind a red colored glass of a centrally located sight opening 43 for displaying a red light and hence constitutes the distinctive unit of the assembly. The conductor 38a of each wheel is electrically connected with this lamp which thus serves as a single signalling unit common to all of the wheels and adapted to be operated whenever the air pressure in any tire approaches a dangerously low condition.

In the operation of the device, the contact nut 7 of each wheel carried circuit closer is adjusted to initially contact the spring contact 6 at a predetermined minimum loss of air pressure for closing the first signal circuit and displaying the white light 39 on the instrument board of the vehicle as an initial warning to the operator of the pressure loss. The operator is thus afforded an opportunity to stop and remedy the undesirable condition or to drive to a nearby service station before the tire pressure has become dangerously low. Further drop in pressure permits the contact nut to engage spring contact 6a for closing the circuit to the red light 40 on the vehicle instrument board. The adjustment of the contact nut 7 should be such that to cause this danger signal to be flashed in time to permit the operator of a speeding vehicle to make the necessary adjustments to meet the situation and to bring the vehicle safely to a stop.

This invention can be applied to motor vehicle trucks as well as to pleasure cars and is easily installed or removed. Due to the fact that the brush connections are made through the housing around the hub, no wires are required to be disconnected when changing tire, wheel or rim, nor does the pressure actuating circuit closer have to be removed since it is fastened on the tire rim separate and apart from the tire valve.

Having thus described the invention, what is claimed is:

In a signalling system for automatically indicating loss of air pressure within the pneumatic tire of a motor vehicle wheel, the combination with a wheel rim and a tire inner tube supported thereon, of a current controlling switch on the inner side of the wheel rim, and including a casing having one end open, a non-conductive member closing said end and separating the casing from the rim, fastening means for fastening the casing and the member to the rim for electrically connecting the casing to the rim, a contact carried by the non-conducting member and located in the casing, a pressure actuated pin operating in an opening in the rim and passing through the non-conducting member into the casing, a member on the pin contacting the inner tube, a spring means tending to move the pin against the tube and a contact member on the pin for engaging the first contact.

ALLIE EDMONSTON.
ARTHUR C. DUCLOS.